H. J. DURBOROW.
STYLUS BAR MOUNTING.
APPLICATION FILED JULY 16, 1920.
1,378,097.
Patented May 17, 1921.
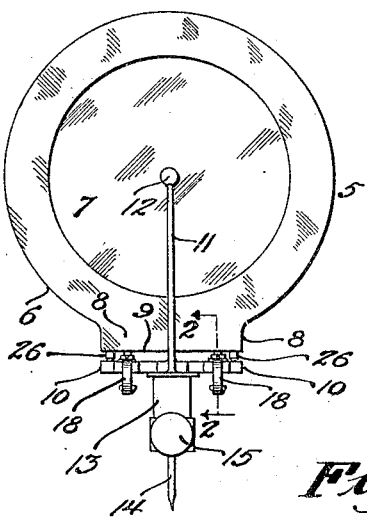
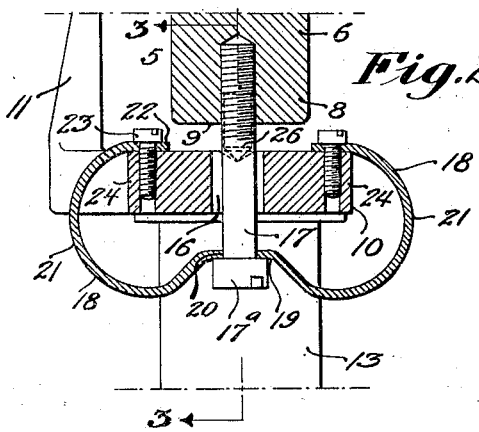
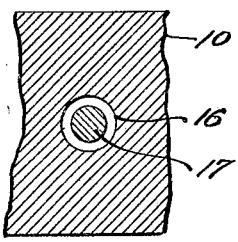
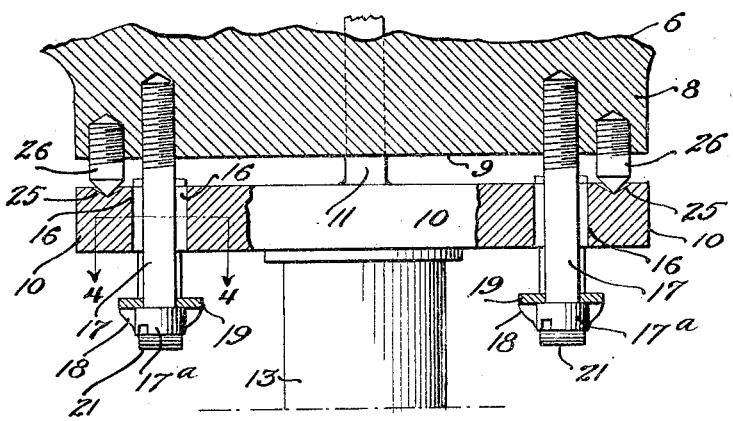
Witnesses
Geo. A. Gruss
Augustus R. Copper
Inventor
Harry J. Durborow
By Joshua R. H. Potts
his Attorney

UNITED STATES PATENT OFFICE.

HARRY J. DURBOROW, OF PHILADELPHIA, PENNSYLVANIA, ASSIGNOR OF ONE-HALF TO BAYARD L. WINDERS, OF PHILADELPHIA, PENNSYLVANIA.

STYLUS-BAR MOUNTING.

1,378,097.  Specification of Letters Patent.  Patented May 17, 1921.

Application filed July 16, 1920. Serial No. 396,673.

*To all whom it may concern:*

Be it known that I, HARRY J. DURBOROW, a citizen of the United States, residing at Philadelphia, in the county of Philadelphia and State of Pennsylvania, have invented certain new and useful Improvements in Stylus-Bar Mountings, of which the following is a specification.

One object of my invention is to provide an improved stylus bar mounting for sound boxes of talking machines, which will be so constructed and balanced that it will more effectively and accurately transmit vibrations from the reproducing needle to the diaphragm than other devices for this purpose which have been made prior to my present invention.

Another object is to so make the parts embodying my present invention that they can be easily and quickly put together or taken apart.

A further object is to make the device of my present invention of a durable and comparatively simple construction which will not accidentally get out of working order.

These objects, and other advantageous ends which will be described hereinafter, I attain in the following manner, reference being had to the accompanying drawings in which—

Figure 1 is a front elevation of a sound box having a stylus arm mounting made in accordance with my present invention, Fig. 2 is an enlarged fragmentary section taken on the line 2—2 of Fig. 1, Fig. 3 is a section taken on the line 3—3 of Fig. 2, and Fig. 4 is a fragmentary section taken on the line 4—4 of Fig. 3.

Referring to the drawings, 5 represents a sound box which includes a diaphragm casing 6 having a diaphragm 7 mounted therein. The casing 6 has a lug or projection 8 extending therefrom; said lug preferably having a plane surface 9 as clearly shown in Figs. 1, 2 and 3. A plate 10 is arranged substantially parallel with and spaced from the surface 9 of the projection 8 and from one side of this plate projects the stylus bar 11; said stylus bar being connected centrally with the diaphragm 7 as shown at 12. The stylus bar plate 10 has a needle chuck 13 extending therefrom; said needle chuck being arranged centrally within the width of the plate 10 and also preferably arranged centrally within the length of the plate 10 as clearly shown in Figs. 2 and 3. The chuck 13 is adapted to support the reproducing needle 14 and a set screw 15 is preferably provided for this purpose.

The stylus bar plate 10 has holes 16 extending through its thickness; said holes being spaced apart within the length of the plate 10 at either side of the chuck 13. These holes 16 are preferably arranged centrally within the width of the plate 10 and directly under the middle of the thickness of the projection 8 as shown in Fig. 2.

Securing devices in the form of screws 17 are screwed into the projection 8 and extend through the respective holes 16. These screws are of smaller diameter than the diameter of the holes 16 and extend through said holes without touching the walls thereof. In other words the screws 17 do not touch the plate 10. The screws 17 have heads 17ª at their lower ends and are spaced below the bottom of the plate 10. Two springs 18 are each similarly formed and preferably made of strap spring steel having central portions 19 provided with holes 20 through which the screws 17 respectively extend so that the heads 17ª of the screws engage the lower surfaces of the central portions 19 of the springs. Each of the springs 18 has opposed bent or looped portions 21 at either side of the central portion 19; said looped portions being preferably of equal size and strength and terminating in ends 22 which are secured to the top of the plate 10 by screws 23 so that the looped portions 21 surround the side edge portions 24 of the plate 10 as clearly shown in Fig. 2. The screws 17 extend centrally within the thickness of the projection 8 and are also located at equal distances from the opposite sides of the needle chuck 13. Each of the looped portions 21 of the springs 28 have parts which are located at a lower level than the central portion 19 and the top of the plate 10 is provided with recesses 25 which are of substantially conical formation. These recesses 25 are located at opposite sides of the screws 17 and are included in a plane which passes through the axes of the screws 17 and chuck 13; said plane also extending centrally through the central portion 10 of the springs 18 between the looped portions 21 thereof. Fulcrum studs 26 have their upper ends screwed in the projection 8 and their lower ends are made conical and fit central within the respective recesses 25. The plate 10 is supported on the springs 15 and the recesses and studs form fulcruming points which are the only means of contact between the diaphragm casing and the plate. By making the spring of the shape described and illustrated equal tension will be imposed upon opposite sides of the plate 10 and the parts will be balanced and any vibrations from the needle will be transmitted to the stylus bar and the springs will serve to accurately return the parts to their normal positions.

One of the most important advantages of my improved stylus bar support is that there is practically no chance for setting up foreign vibrations since the only means of direct contact is through the medium of the spring and fulcruming studs and recesses. Furthermore the parts can be easily put together and taken apart.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. The combination with a sound box having a diaphragm casing and a diaphragm therein, of a stylus bar mounting including a plate having a stylus bar extending therefrom for attachment with the diaphragm; means providing a fulcruming contact between the plate and the casing; springs having looped end portions connected to said plate and central portions between said looped portions; and means for connecting said central portions to said casing independently of said plate; substantially as described.

2. The combination with a sound box having a diaphragm casing and a diaphragm therein, of a stylus bar mounting including a plate having a stylus bar extending therefrom for attachment with the diaphragm; means providing a fulcruming contact between the plate and the casing; springs having looped end portions connected to said plate and central portions between said looped portions; holes within said plate; and screws connecting said central portions of the springs with the casing and extending through said holes, said screws being out of contact with the walls of said holes; substantially as described.

3. The combination with a sound box having a diaphragm casing and a diaphragm therein, of a stylus bar mounting including a plate having a stylus bar extending therefrom for attachment with the diaphragm; means providing a fulcruming contact between the plate and the casing; springs having looped end portions connected to said plate and central portions between said looped portions; and means for connecting said central portions to said casing independently of said plate, the central portions of said springs being included in a plane passing through the middle of the width of said plate; substantially as described.

In testimony whereof I have signed my name to this specification in the presence of two subscribing witnesses.

HARRY J. DURBOROW.

Witnesses:
   AUGUSTUS B. COPPES,
   CHAS. E. POTTS.